(12) United States Patent
Webster et al.

(10) Patent No.: US 8,482,607 B2
(45) Date of Patent: Jul. 9, 2013

(54) POSITION SENSING OF A PISTON IN A HYDRAULIC CYLINDER USING A PHOTO IMAGE SENSOR

(76) Inventors: Timothy David Webster, Vancouver (CA); Ashu M. G. Solo, Saskatoon (CA); Qing Wu, Vancouver (CA); Wen Jun Yang, Vancouver (CA)

( * ) Notice: Subject to any disclaimer, the term of this patent is extended or adjusted under 35 U.S.C. 154(b) by 470 days.

(21) Appl. No.: 12/921,400

(22) PCT Filed: Jun. 24, 2008

(86) PCT No.: PCT/IB2008/052495
§ 371 (c)(1),
(2), (4) Date: Sep. 8, 2010

(87) PCT Pub. No.: WO2009/112895
PCT Pub. Date: Sep. 17, 2009

(65) Prior Publication Data
US 2011/0007153 A1    Jan. 13, 2011

Related U.S. Application Data

(60) Provisional application No. 61/035,044, filed on Mar. 10, 2008.

(51) Int. Cl.
*H04N 7/18* (2006.01)
(52) U.S. Cl.
USPC .............................. 348/135; 348/61; 250/231
(58) Field of Classification Search
USPC .......................................... 348/135; 250/231
See application file for complete search history.

(56) References Cited

U.S. PATENT DOCUMENTS

| | | | |
|---|---|---|---|
| 3,970,034 A | 7/1976 | Kirk | |
| 4,523,514 A | 6/1985 | Burk | |
| 4,814,553 A | 3/1989 | Joyce | |
| 4,936,143 A | 6/1990 | Schutten et al. | |
| 5,003,171 A | 3/1991 | Paley | |
| 5,201,838 A | 4/1993 | Roudaut | |
| 5,438,261 A | 8/1995 | Codina et al. | |
| 5,438,274 A | 8/1995 | Bitar et al. | |
| 5,471,147 A | 11/1995 | Allen et al. | |
| 5,617,034 A | 4/1997 | Lark et al. | |
| 5,977,778 A | 11/1999 | Chan et al. | |
| 6,234,061 B1 | 5/2001 | Glasson | |
| 6,433,780 B1 | 8/2002 | Gordon et al. | |
| 6,549,873 B1 | 4/2003 | Nagai | |
| 6,642,506 B1 | 11/2003 | Nahum et al. | |
| 6,690,160 B2 | 2/2004 | Gray et al. | |
| 6,694,861 B2 | 2/2004 | Glasson | |
| 6,722,260 B1 | 4/2004 | Brown | |
| 6,817,252 B2 | 11/2004 | Wiklund et al. | |
| 6,848,323 B2 | 2/2005 | Krouth et al. | |
| 6,989,669 B2 * | 1/2006 | Low et al. | 324/207.25 |
| 7,119,323 B1 | 10/2006 | Brosnan et al. | |
| 7,268,341 B2 | 9/2007 | Lehoty et al. | |
| 7,492,445 B1 | 2/2009 | Todoroff et al. | |
| 7,498,563 B2 | 3/2009 | Mandro et al. | |
| 2005/0051742 A1* | 3/2005 | Shiraishi | 250/548 |
| 2010/0281969 A1* | 11/2010 | Seidel et al. | 73/168 |

* cited by examiner

*Primary Examiner* — Christopher S Kelley
*Assistant Examiner* — Asmamaw G Tarko

(57) ABSTRACT

Described is a device and method of measuring the linear position of a piston 002 movable within a hydraulic or pneumatic cylinder barrel 001. The measuring device includes a photo optical sensing apparatus 011 mounted at the cylinder head. The photo optical sensing apparatus 011 can be located inside or outside of the cylinder 001. The sensing apparatus 011 design utilizes a typical optical sensing apparatus, and optional functional modules for determining absolute displacement, and communication. Calibration locations, which are used to obtain absolute displacement measurements, are determined by calibration images or separate sensors indicating their presence.

20 Claims, 7 Drawing Sheets

POSITION SENSING OF A PISTON IN A HYDRAULIC CYLINDER USING A PHOTO IMAGE SENSOR

BACKGROUND OF THE INVENTION

1. Field of Invention

This invention relates to using an optical photo sensor for measuring mechanical movement of a piston, rotor, joint, or other mechanical apparatus with reliable absolute position measurements obtained through repeated calibration of the optical photo sensor measured relative to the position of the piston, rotor, joint, or other mechanical apparatus.

2. Description of Prior Art

Measuring the absolute position of a piston relative to the cylinder is fundamental to control the operation of machinery. Correspondingly, industry has produced a variety of position sensing apparatuses using mechanical, magnetic, acoustic, and optical techniques for determining the instantaneous position of the movable piston or rotor.

One class of piston position sensing techniques is based on magnetic field sensors. U.S. Pat. No. 6,989,669 B2 forms a magnetically hard layer on the piston rod, and uses sensor to read the magnetic pattern recorded in the layer. However, the piston rod needs to be reproduced in order to form a magnetically hard layer on it, and the harsh environment may accidentally erase or alternate the magnetic pattern, which causes measurement unreliability. U.S. Pat. No. 6,690,160 B2 grooves the housing of the cylinder and mounts two magnetic members in the cylinder housing. Then, a magnetic field sensor generates signals which indicate the relative distance between the two magnetic members. Accordingly, the piston position is determined. This invention needs to groove the cylinder housing, which make the manufacturing and changing of component not easy. U.S. Pat. No. 5,201,838 uses a Hall effect transistor to sense the magnetic field which is generated by a permanent magnet. The sensed signal is used to determine the position of the piston. The accuracy of position measurement depends on the performance of the magnetic field sensor in use, and this class of position sensing technique is vulnerable in a strong magnetic environment.

Some inventions indirectly measure the piston position using various sensors. For example, U.S. Pat. No. 6,817,252 B2 uses a bi-directional flow sensor; U.S. Pat. No. 3,970,034 uses co-operating pairs of pressure sensors; U.S. Pat. No. 6,848,323 B2 measures the position based on a differential pressure flow sensor. U.S. Pat. No. 6,549,873 B1 senses the speed of ultrasonic wave and records time length. In U.S. Pat. No. 4,523,514, a potentiometric positioning sensing transducer is used, which is immunized to electrical noise. These sensors are readily available. However a complex detector means is required in order to obtain an accurate measurement. Moreover, correction required for accurate measurement requires additional sensors or apparatus, which increase the expenses. Even with complex additional sensors the accuracy of these sensing methods is very limited.

Resonant frequency techniques have been used in several inventions, such as U.S. Pat. Nos. 5,471,147, 5,438,274, 4,936,143, 5,617,034. The common feature of this class of position measurement methods is that a RF transmitting section and a receiving section are used to determine the resonant frequency of the cavity, which indicates the piston position. The RF signals in use include radio frequency signals, alternating pressure signals, and electromagnetic waves. Unfortunately oil is an efficient absorber of RF energy, as a result a significant portion of the transmitted RF energy is lost to heating the oil.

Piston position sensing techniques based on mechanical or electromechanical sensors were designed, for example, U.S. Pat. No. 5,438,261 uses a coil and an oscillator which produces a position signal as the reciprocating movement of the piston. U.S. Pat. Nos. 6,234,061 B1 and 6,694,861 B2 both use a non-contacting electromechanical transducer to provide an output signal proportional to the position or motion of the piston. However, these inventions need to mount the measurement apparatus in the cylinder, which makes manufacture and maintenance not easy. Moreover, extra power is needed to transmit and receive signals.

U.S. Pat. Nos. 5,977,778 and 6,722,260 B1 use the reflection of signals to measure the piston position in a cylinder. The signals in use include electromagnetic bursts and microwave pulses. The extension measurement directly depends on the transmitter and receiver. However, in order to obtain a more accurate measurement, more power is needed for signal transmitting and receiving. Moreover, the leaking of electromagnetic bursts or microwave pulses may be harmful to the surroundings, and the cylinder needs to be extensively modified to accommodate the sensing assembly, which causes relatively high complexity and cost, and relatively low reliability, durability, and accuracy.

Moreover, U.S. Pat. Nos. 4,814,553 and 7,268,341 provides an optical apparatus for determining the absolute position of a point on a surface or along a path including a tablet, scale, or overlay and a movable mouse-type cursor. The optical apparatus relies on markings added to the surface of the moving piston or rotor. These optical markings are costly to produce and are prone to rapid wear.

OBJECTS AND ADVANTAGES

Standard commercial photo optical image sensing apparatus such as those used in a computer optical mice are inexpensive, reliable and draw very little power. These photo image sensors can measure relative horizontal displacement on a wide variety of surfaces. The photo image sensors are able to withstand extremely high shock loads and a wide temperature range. These characteristics combined with the photo image sensor low cost, results in the photo image sensors being an attractive alternative to conventional position sensors used for piston or rotary actuators.

These photo image sensors are however susceptible to airborne and surface contaminants which affect the optical image quality resolved by the photo image sensor. This limitation is overcome by enclosing the photo image sensor inside a protective housing. The protective housing is sealed against the movable piston or rotor surface. This arrangement prevents airborne and surface contaminants from entering into the protected enclosed space housing the photo image sensor. The protective housing also protects the photo image sensor from mechanical damage in the industrial application environment. As a result of the small size of the photo image sensor, the protective housing can be mounted without significant modification to either piston or rotary actuators. For example, on piston actuators, the protective housing enclosing the photo image sensor can be easily mounted at the cylinder head either inside the cylinder body or outside the cylinder body.

High resolution standard commercial photo image sensors are available with resolutions of 1600 counts per inch or greater. The error distance measured in counts is extremely small. Low cost photo image sensors with error distances of less than 5 counts in 6400 are commonly available. However, if the absolute displacement measurement of the piston or rotor is not corrected, errors will accumulate over time. This limitation is overcome by integrating the calibration positions that reduced the accumulated error. At these calibration positions, the absolute displacement measurement is rectified which zeros the accumulated error distance. The high accuracy of the photo image sensor is maintained by zeroing the accumulated error distance. As a result, the limitations which currently prevent economical mass produced photo image sensors from greater industrial application use are overcome.

SUMMARY

Accordingly, an apparatus to measure the planar movement between surfaces in applications such as a piston within a cylinder includes a photo image sensing apparatus fixed at the cylinder head. The designed photo image sensing apparatus utilizes a typical optical sensing apparatus, and optional functional modules for determining absolute displacement, traveled path distance, and communication. Calibration locations, which are used to obtain absolute displacement measurements, are determined by calibration images or separate sensors indicating their presence.

DRAWINGS—FIGURES

The advantages of this invention may be better understood by reading the following description as well as the accompanying drawings, where numerals indicates the structural elements and features in various figures. The drawings are not necessarily to scale, and they demonstrate the principles of the invention.

REFERENCE NUMERALS

Figure 1:
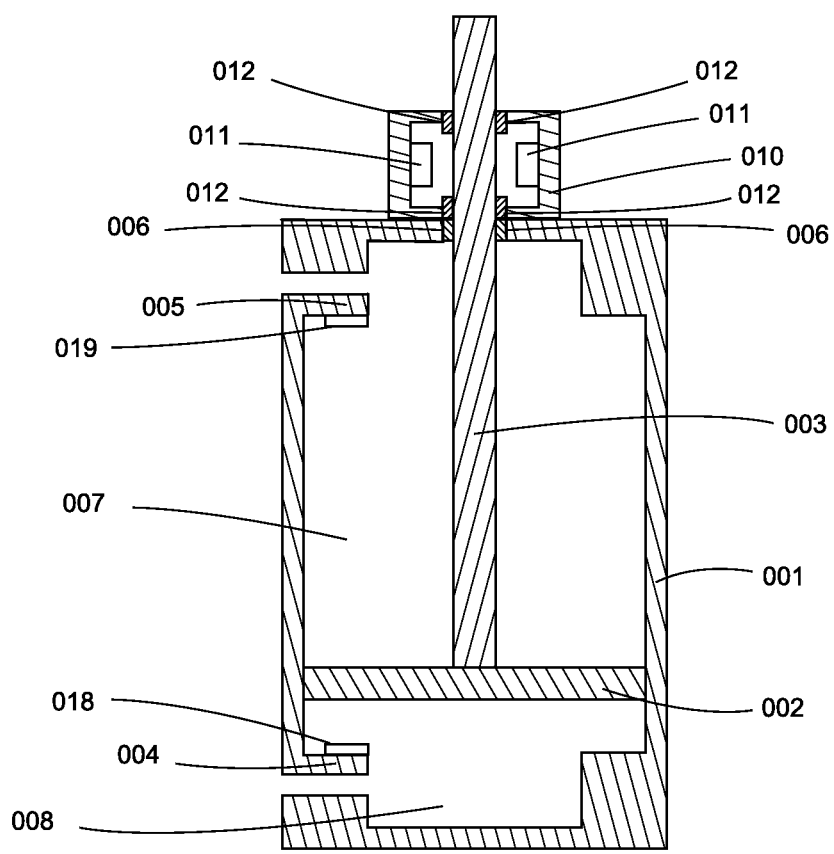
FIG. 1 is a cross section view of a hydraulic cylinder with an attached photo image sensor taken along cutting plane A-A of FIG. 6.

001 hydraulic cylinder barrel
002 piston
003 piston rod
004 base stop
005 head stop
006 seal in cylinder
007 hydraulic cylinder head chamber
008 hydraulic cylinder base chamber
010 sensing apparatus housing
011 photo image sensing apparatus
012 seals for sensing apparatus
018 base contact pressure sensor
019 head contact pressure sensor
030 sensor board
031 microprocessor
032 EPROM
033 SRAM/Flash
034 RAM
035 battery
036 image sensor
037 light emitting diode or laser
038 light opening
039 USB interfaces
040 CAN bus interface
051 recorded calibration pattern
052 encoded calibration pattern
053 calibration pattern at position 1
054 calibration pattern at position 2
055 calibration pattern at position 3
060 reset timer
062 initialization, validation and communication
064 read main operating state
066 operation or calibration state decision
068 calibration state
070 position measurement operation state
072 communication service
080 read pixel image
082 pattern match between current position pixel image and previous position pixel image
084 measure relative displacement
085 estimated absolute displacement
086 pattern match between current position pixel image and calibration pixel image
088 matched calibration image decision
090 measure absolute displacement between current position and calibration position
091 statistical analysis
092 estimate absolute displacement from previous absolute displacement and relative displacement
093 reliability analysis
094 read contact register
096 no contact decision
098 no operation
100 base contact decision
102 reset absolute displacement to minimum
104 head contact decision
106 reset absolute displacement to maximum
108 report error

DETAILED DESCRIPTION

Figure 6:
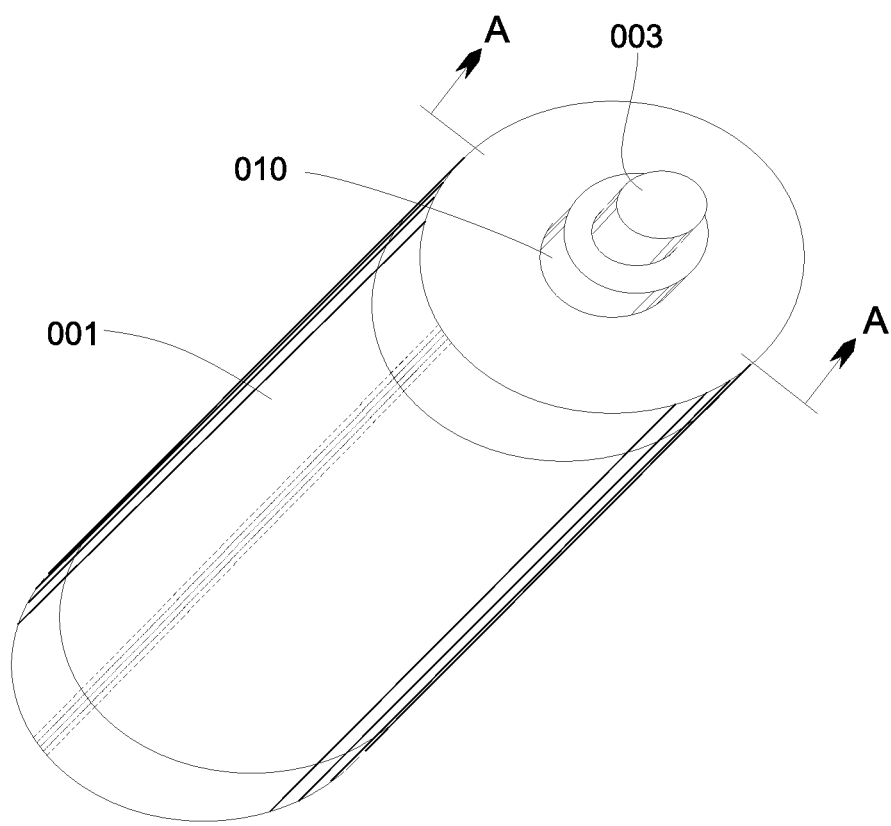
FIG. 6 is an isometric view of hydraulic cylinder with an attached photo image sensor

FIG. 6 is an isometric view of hydraulic cylinder with an attached photo image sensor and shows the cutting line A-A used to obtain the cross section shown in FIG. 1.

FIG. 1 shows a side cross-sectional view of an embodiment of a hydraulic cylinder assembly with a photo image sensing apparatus 011. The hydraulic cylinder assembly includes a cylinder barrel 001 and a sensing apparatus housing 010. A piston 002 is arranged within the cylinder barrel 001 for reciprocating motion along an axis in response to hydraulic fluid. The piston 002 partitions the cylinder barrel 001 into two chambers, 007 and 008. The housing 010 is securely mounted on the cylinder barrel 001.

One end of a piston rod 003 is fixed to the piston 002 and extends along the axis of the movement. The other end of the piston rod 003 extends out of the housing 010. Either or both the cylinder base and outside end of the piston rod 003 maybe connected directly or indirectly with a machine component.

The cylinder barrel 001 has two openings for the passage of fluid such as oil or water into and out of the chambers 007, 008 for moving the piston 002. Seals 006 within the cylinder barrel 001 are arranged to lie flush with the surface of the piston rod 003 and thus prevent fluid from leaving the chamber 007.

The housing 010 encloses a photo image sensing apparatus 011, which is used to determine the instantaneous position of the piston rod 003. Seals 012 within the housing 010 are arranged to clean the surface of the piston rod 003 and thus prevent fluid or dirt from contaminating the sensing apparatus 011. The housing 010 provides protection for the photo image sensing apparatus 011 from the environment and permits easy replacement of the sensing unit. The photo image sensing apparatus 011 is mounted in the housing 010 within proximity of the piston rod's surface to permit reading of the movement of the piston rod 003.

The head contact pressure sensor 019 is mounted at the head stop 005 of the cylinder barrel 001. The base contact pressure sensor 018 is mounted at the base stop 004 of the cylinder barrel 001. Together these two contact sensors provide a two-bit digital signal to indicate whether the piston 002 reaches the head stop 005 or the base stop 004, or neither. Correspondingly when the piston 002 reaches either the head 005 or base stop 004, the absolute displacement information in storage is adjusted and updated.

In operation, fluid forced into or removed from the chambers 007, 008 at time-varying pressures causes the piston 002 and thus the piston rod 003 to slide back and forth relative to the photo image sensor 011. The photo image sensor 011 reads the relative displacement of the piston rod 003 and produces a corresponding digital signal. The microprocessor 031 on the sensor board 030 calculates the absolute displacement of the piston rod 003 by matching the calibration pattern and using the relative displacement. The obtained absolute displacement indicates the actual position of the piston rod 003 and piston 002.

Figure 2:
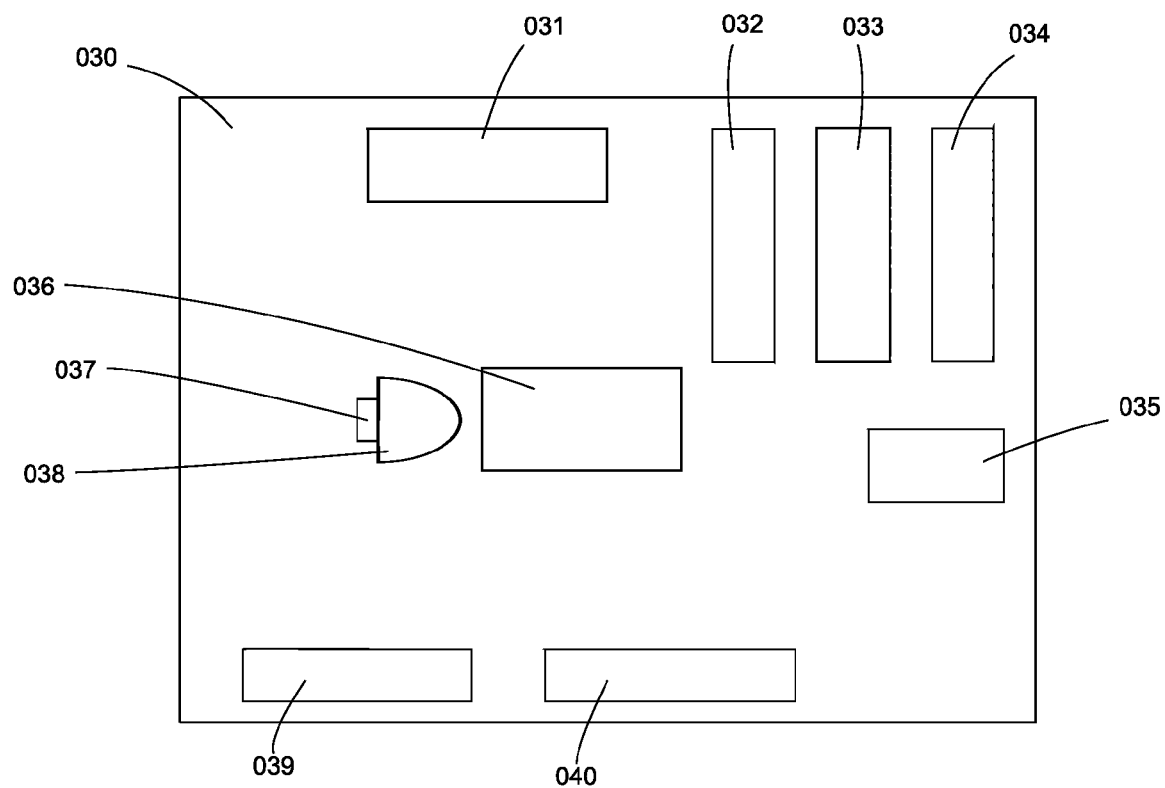
FIG. 2 is block diagram of a photo image sensing apparatus.

FIG. 2 is a diagrammatic view of the laser photo optical sensing apparatus 011, which includes a light emitting diode or laser 037, a pixel image sensor 036, a microprocessor 031, and peripheral electronic circuit. The light emitter 037 projects light, the light beam reflected from the piston rod 003 surface, and the image sensor 036 captures the reflected image. Afterwards the image sensor 036 transfers the captured pixel image to the microprocessor 031. The microprocessor 031 calculates the relative displacement and the absolute displacement by comparing the current captured pixel image with the stored pixel images. A SRAM or Flash memory 033 stores a recorded calibration pattern 051 of the piston rod 003 at a specific location, and an EPROM 032 stores encoded calibration pattern 052 of the piston rod 003 at a specific location and program used by the microprocessor 031. A battery 035 is used to supply power for the sensing apparatus 011. The sensor board 030 provides communication interface, one is USB interface 039 and the other is CAN bus interface 040. The USB interface 039 is used to communicate with the contact pressure sensors 018, 019 within the cylinder barrel 001, and the CAN bus interface 040 is used to communicate with other units on the machine. The sensor board 030 is quite similar with the electronic board in an optical mouse. Extra functional modules are added to achieve additional calibration and communication functionalities.

Figure 3A:
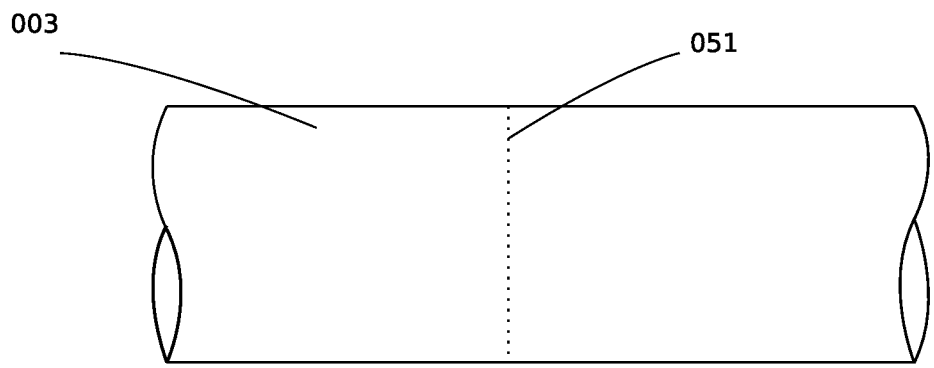
FIG. 3A is a side view of a piston rod with recorded calibration pattern.
Figure 3B:
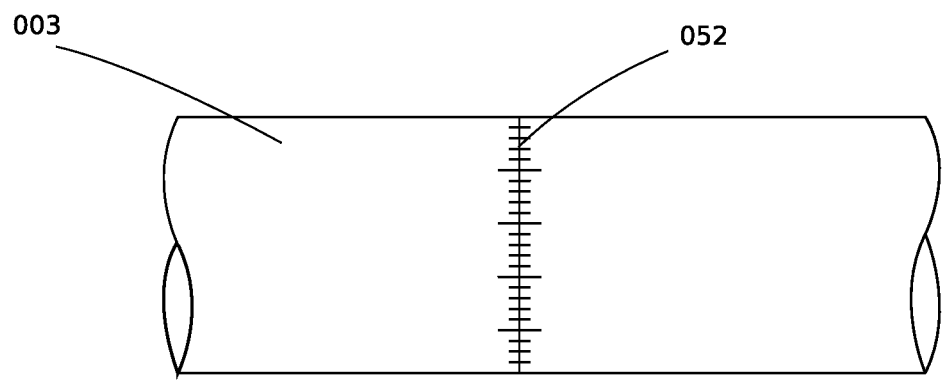
FIG. 3B is a side view of a piston rod with encoded calibration pattern.

FIG. 3A and FIG. 3B are diagrammatic views of two piston rods 003 with different calibration patterns. In FIG. 3A, the pattern 051 on the piston rod 003 is an inherent feature of the piston rod 003 at a specific location. In FIG. 3B, the pattern on the piston rod 003 represents an encoded feature stenciled at a specific location on the piston rod 003. The pattern shown in FIG. 3B is a representative example of one of many possible choices which will uniquely identify the piston rod's 003 position. The purpose of the encoded pattern 052 is to easily calibrate the absolute displacement. Both of these two calibration patterns can be used to calculate the absolute displacement of the piston rod 003.

Figure 3C:
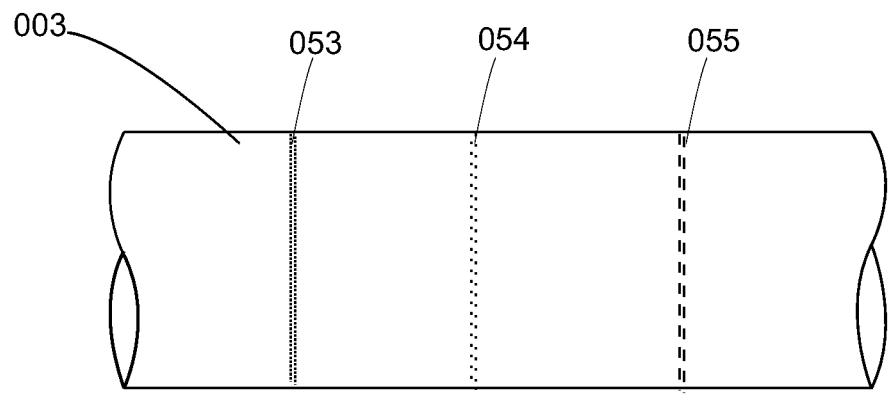
FIG. 3C is a side view of a piston rod with different calibration patterns at three positions.

FIG. 3C is a diagrammatic view of a piston rod 003 with three different calibration patterns 053, 054, and 055 at three calibration positions. These three calibration patterns can be either recorded ones or encoded ones. The number of calibration patterns is not confined to three. The number and placement of calibration patterns is determined by application requirements. Multiple calibration patterns enables more frequent calculation of the absolute displacement so that the estimated absolute displacement is closer to the actual absolute displacement. Unique calibration patterns make it possible to determine which is the current calibration position based on its calibration pattern.

The multiple calibration positions can be used to estimate the piston absolute displacement as follows. In order to avoid unnecessary number of comparisons, the current absolute displacement of the piston is used to determine the two calibration positions bordering it. In the case where all the calibration positions are to one side of the piston, only the first calibration position needs to be considered. The observed surface at the current absolute displacement only needs to be compared with the two adjacent calibration patterns. For example, if the piston is located between the calibration position 1 and 2, then the observed surface absolute displacement only needs to be compared with the calibration patterns 053 and 054.

The surface quality or average pixel shade of the piston rod are measured by the laser image sensor 036. A suddenly change in surface quality or average pixel shade is used to indicate a calibration position. The surface quality or average pixel shade at each calibration position differ such that their unique surface qualities distinguish each from the other. Unique surface qualities or pixel shades of each calibration position are not necessary to calibrate the absolute displacement measurement. The Unique calibration positions ensure that one calibration position is not mistaken for another. The neighbouring calibration positions are determined by the piston's current estimated absolute displacement. When a calibration position is detected by its suddenly changed surface quality/average pixel shade or by recognizing its specific surface quality/average pixel shade, the piston absolute displacement estimated is corrected. The surface qualities and/or pixel shades at all calibration positions are pre-stored in the Flash memory 033 or EPROM 032 as required.

Figure 4:
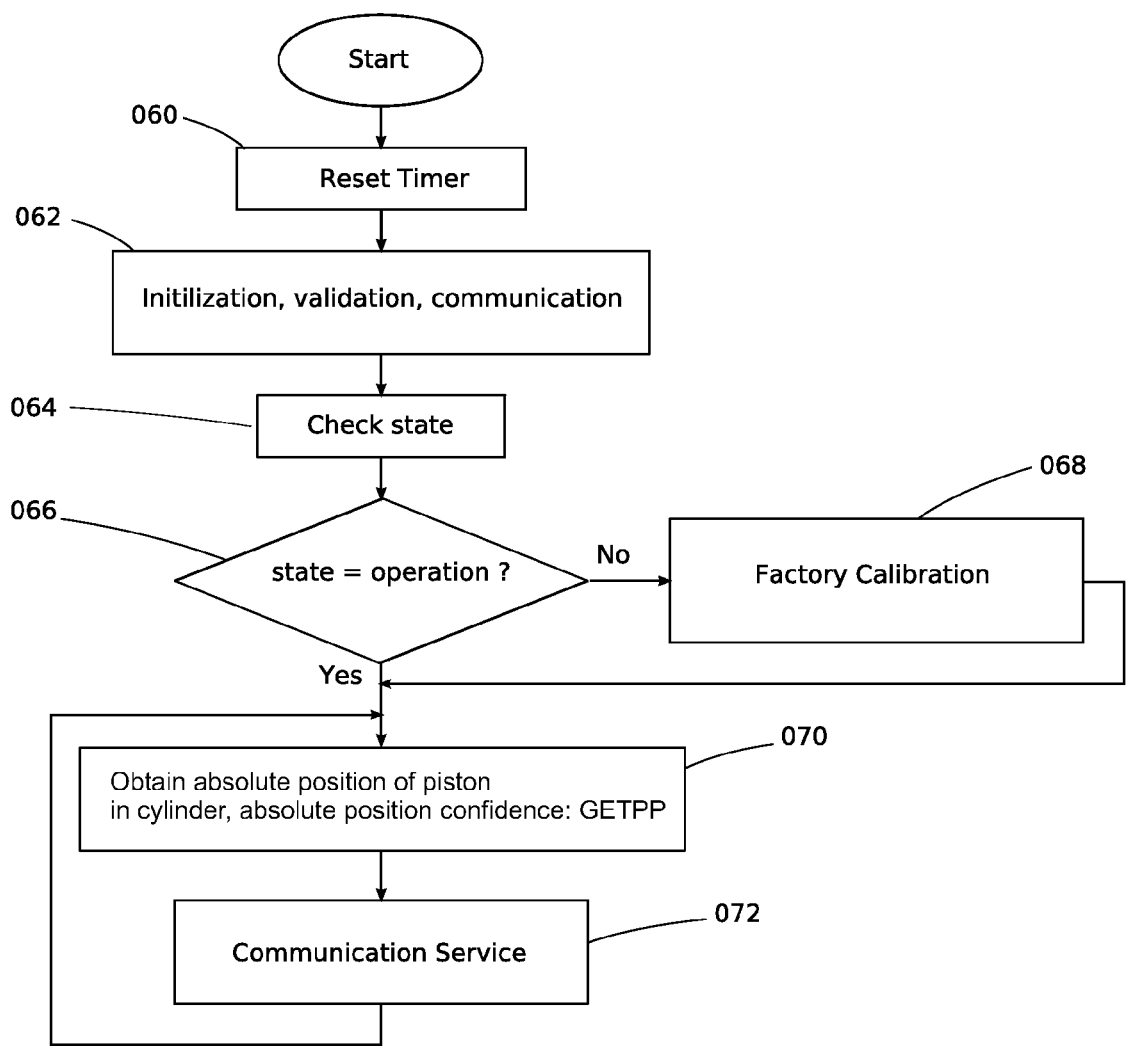
FIG. 4 is a flow diagram of the main control loop of an embodiment of the present invention.

FIG. 4 refers to the main control logic of the laser photo optical sensing apparatus 011. In control block 060, a timer is reset. The timer is of conventional design and is used to detect if the microprocessor 031 is not executing the designed control logic. The use of a timer is well known in the art and is therefore not further discussed.

In control block 062, the system is initialized. The initialization routine includes validating the hardware, and software parameters, testing the communication channels. Any errors detected during this initialization process are reported according to their severity. Critical errors which prevent the initialization process from completing or would prevent the correct operation of the sensing apparatus 011 cause the microprocessor 031 to report a warning error or the microprocessor 031 to exit on critical error.

In control block 064, the state of the sensing apparatus 011 is checked. The sensing apparatus 011 has two functional states, one is operation, and the other is calibration.

If the state is the calibration state, control flow proceeds to the control block 068. If the state is the operation state, control flow proceeds to the control block 070.

In control block 068, the location of the recorded calibration pattern is precisely measured, and the location and pattern information is stored into the SRAM 033.

In control block 070, the subroutine GETPP is called. As explained below, the GETPP subroutine determines the absolute displacement of the piston rod 003 and a confidence interval of the estimated absolute displacement.

In control block 072, the system communications are serviced. This includes reading the absolute displacements from the SRAM/Flash 033, calculating a checksum for transmission purposes, transmitting the data from the sensor apparatus 011 to other control units, and indicating the reliability of the sensor apparatus 011.

Figure 5:
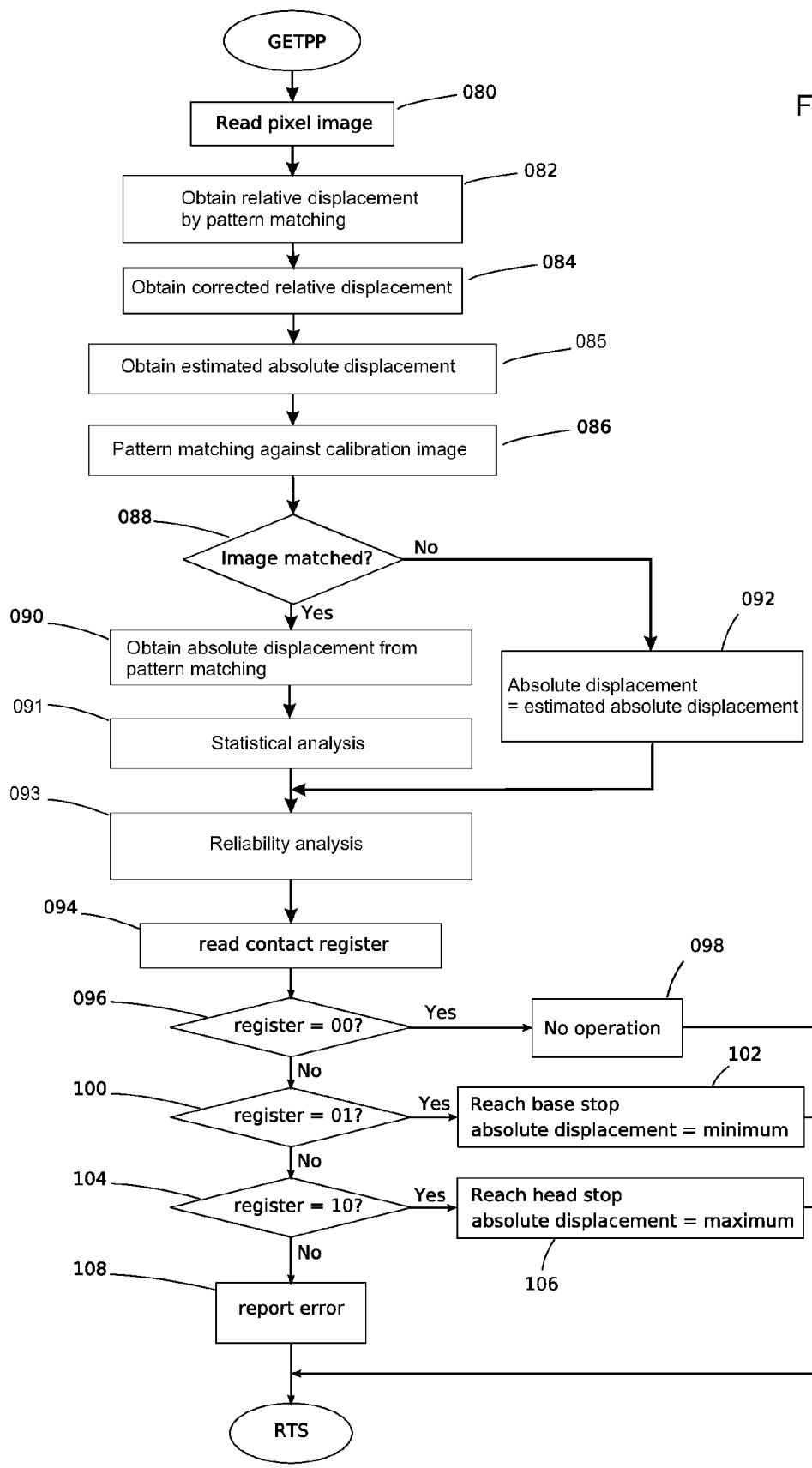
FIG. 5 is a flow diagram of the positioning subroutine as called by the main control loop of FIG. 4.

FIG. 5 illustrates the operation of the subroutine GETPP, which calculates the absolute displacement of the piston rod 003.

In control block 080, the photo image sensor 036 reads the pixel image of the light reflected from the surface of the piston rod 003, and then sends the pixel image to the microprocessor 031.

In control block 082, the microprocessor 031 reads the previous pixel image from the RAM 034, and compares it with the current pixel image received from the photo image sensor 036. Then, the microprocessor 031 calculates the relative displacement of the piston rod 003 and stores it into the RAM 034. A movement count is used to record the number of relative displacement measurements taken since previous absolute displacement measurement at the calibration position. The movement count increments by one and is stored into the SRAM/FLASH 033.

In control block 084, the microprocessor 031 reads the mean absolute displacement error and the movement count from SRAM/FLASH 033, and reads the relative displacement of the piston from RAM 034. Then, the microprocessor 031 uses this information to correct the relative displacement, and stores the corrected relative displacement into RAM 034.

In control block 085, a corrected absolute displacement is calculated by adding the most recent corrected relative displacement to the previous corrected absolute displacement. The calculated corrected absolute displacement is named as estimated absolute displacement, and it is stored into the SRAM/FLASH 033.

In control block 086, the microprocessor 031 compares the current pixel image with the calibration patterns which are stored in EPROM 032 or SRAM/FLASH 033, respectively.

In control block 088, if the current pixel image matches either of the calibration patterns 051 or 052, the control goes to control block 090, Otherwise, control proceeds to control block 092.

In control block 090, the absolute displacement is directly obtained from the precise location of either the calibration patterns 051 or 052. The absolute displacement is obtained by pattern matching the current pixel image with the stored calibration patterns 051 or 052. The new absolute displacement is stored into the SRAM/FLASH 033.

In control block 091, statistical analysis is implemented. The absolute displacement measurement error, movement count, and traveled path distance are first calculated and stored into SRAM/FLASH 033. The absolute displacement measurement error is calculated using the following pseudo code:

Estimate absolute displacement=Absolute displacement at most recent count+Relative displacement measurements Thus, the absolute displacement measurement error is calculated using the following pseudo code:

Absolute displacement measurement error=Absolute displacement at a calibration location−Estimated absolute displacement at the calibration location The traveled path distance is calculated using the following pseudo code:

Traveled path distance=Sum of the absolute values of all previous relative displacements Then, the microprocessor 031 calculates the mean and variance of the absolute displacement error in relation to movement count. Obviously, the error mean and variance will increase as the movement count increases.

The mean and variance of the absolute displacement error is stored in the SRAM/FLASH 033 for the correction of the relative displacement in control block 084. Finally, the movement count is reset to be zero.

In control block 092, the absolute displacement is set to be the estimated absolute displacement.

In control block 093, reliability of the absolute displacement estimation is analyzed. The relationship between the absolute displacement measurement error and the traveled path distance of the piston rod 003 is determined, where the absolute displacement measurement error is described as a function of the traveled path distance. Basically, the absolute displacement measurement error increases as the traveled path distance increases. Accordingly, the function is used to determine the reliable or confident path distance the piston rod can travel.

Moreover, the microprocessor 031 calculates a confidence interval of the estimated absolute displacement using its probability density function and movement count. Excessively low confidence in the estimated absolute displacement signals that the optical apparatus for measuring mechanical displacement is not functioning with sufficient accuracy and corrective measures are required.

Furthermore, the possibility density distribution of the absolute displacement measurement error with respect to the absolute displacement and/or traveled path distance is calculated. The possibility density distribution function is used to optimally determine the number and location distribution of the calibration patterns, which to the greatest extent minimize the absolute displacement measurement error.

In control block 094, a register that indicates the states of the two contact pressure sensors 018 and 019 in the cylinder barrel 001 is read by the microprocessor 031.

In control block 096, if the register's value is 00, the piston 003 has neither reached the base stop 004 nor the head stop 005, then control goes to control block 098. Otherwise, control proceeds to control block 100.

In control block 098, no operation and control returns to the main control loop.

In control block 100, if the register's value is 01, the piston 002 has reached the base stop 004, then control goes to control block 102. Otherwise, control proceeds to control block 104.

In control block 102, the absolute displacement value is set to its minimum and control returns to the main control loop.

In control block 104, if the register's value is 10, the piston 002 has reached the head stop 005, then control goes to control block 106. Otherwise, control proceeds to control block 108.

In control block 106, the absolute displacement value is set to its maximum and control returns to the main control loop.

In control block 108, the register's value must be 11 or uncertain value, which means an error has occurred. In this case, an error is reported and control returns to the main control loop.

Conclusion, Ramifications, and Scope

Although the invention has been described and shown with reference to specific preferred embodiments, it should be understood by those who are skilled in the art that some modification in form and detail may be made therein without deviating from the spirit and scope of the invention as defined in the following claims. For example, the housing 010 can be mounted within the cylinder barrel 001 in order to avoid shortening the stroke length of the piston 002. Although the embodiments described above primarily concerns the measurement of piston's linear extension or rotary movement, the principles of the invention can be used to determine the rotation direction and angle of the piston rod 003. The sensor apparatus 011 can equally be attached to shaft, or rotating surface of rotary devices. The application of the sensor apparatus 011 needs not be restricted to the described embodiment for measuring a piston's linear or rotary movement. Alternative optical lens such as a micro-lens is used to modify the working distance between the sensor apparatus 011 and the surface of which the sensor apparatus 011 is measuring movement.

The sensor apparatus 011 can also measure movement by means of observing a moving surface of hinge, swivel, sliding and spherical joints. When a suitable surface does not exist as part of a joining apparatus, a part with a suitable surface can be attached to the apparatus. By adding an additional part or parts to a joined apparatus, the sensor apparatus 011 can be mounted at different location and measure its displacement with respect to the surface of the added part.

The advantages provided by the sensor apparatus 011 included in this invention over prior art position sensors are availability of inexpensive, reliable, low power sensors. The sensor apparatus 011 is more easily installed on a wide variety of jointed apparatus than prior art position sensors. And the position and path distance measurement provided by the sensor apparatus makes it easy to integrated with digital electronic control systems.

Thus the scope of the invention should be determined not by the embodiments illustrated, but by the appended claims and their legal equivalents.

What is claimed is:

1. An optical apparatus for measuring absolute mechanical displacement of actuators, joints, or other mechanical apparatus that contain mechanical parts that move with respect to each other, comprising:
    a. an optical means of measuring relative displacement of second part of said mechanical apparatus with respect to first part of said mechanical apparatus where said optical means is fixed to said second part of said mechanical apparatus and where said second part is any of the parts of said mechanical apparatus, such that said optical means of measuring relative displacement is directed at the surface of said first part of said mechanical apparatus where said first part is any of the other parts of said mechanical apparatus such that said optical means of measuring relative displacement is able to detect relative displacement distance of said surface of said first part of said mechanical apparatus, and such that marks created on said surface to stand out from natural optical patterns on said surface are not required by said optical means of measuring relative displacement,
    b. one or more calibration positions, such that the absolute displacement of said first part of said mechanical apparatus at said calibration positions is known,
    c. a means of detecting calibration position alignment, such that said first part of said mechanical apparatus and said second part of said mechanical apparatus are aligned at said calibration position,
    d. an estimated absolute mechanical displacement that is a summation of the cumulative net relative displacement obtained by said optical means of measuring relative displacement since a detected said calibration position alignment and the known absolute displacement at said detected calibration position alignment, such that said estimated absolute mechanical displacement is equal to said known absolute displacement when said first part of said mechanical apparatus and said second part of said mechanical apparatus are aligned at said detected calibration position alignment and such that if one or more correction multipliers are available, one or more said correction multipliers are applied to said cumulative net relative displacement and/or individual relative displacement measurements obtained by said optical means of measuring relative displacement comprised in said cumulative net relative displacement,
    whereby the measured absolute displacement of said first part of said mechanical apparatus is corrected at said calibration positions and does not require adjacent said calibration positions,
    whereby the absolute displacement of said first part of said mechanical apparatus is estimated with accuracy and precision by said optical means of measuring relative displacement allowing for a reduction in the number of said calibration positions,
    whereby the apparatus cost is reduced through the reduction in required number of said calibration positions.

2. The optical apparatus of claim 1, wherein said optical means of measuring relative displacement correlates the current optical pattern obtained from said surface of said first part of said mechanical apparatus with a previous optical pattern obtained from said surface of said first part of said mechanical apparatus,
    whereby relative displacement are measured with mass produced sensor components used by optical mice.

3. The optical apparatus of claim 1, wherein said optical means of measuring relative displacement includes an interferometer having a monochromatic coherent light beam split between a reference and measurement branch, such that light in the measurement branch undergoes a Doppler frequency shift whose sign and magnitude correspond respectively to the direction and magnitude of the velocity, such that the optically measured velocity over the measurement interval is used to obtained measured relative displacement,
    whereby relative displacement are measured with mass produced sensor components used by optical mice.

4. The optical apparatus of claim 1, wherein said means of detecting calibration position alignment comprises:
    a. one or more proximity targets fixed to said first part or said second part of said mechanical apparatus, such that the location of said proximity targets correspond to said calibration positions,
    b. one or more proximity sensors fixed to other said second part or said first part of said mechanical apparatus, such that said proximity sensors are mounted as required to detect said proximity targets, whereby said calibration positions are marked by said proximity targets, which are suitable for capacitive, photoelectric, and/or magnetic detection by said proximity sensors, whereby the measured absolute displacement is corrected by said proximity sensors, which detect said proximity targets.

5. The optical apparatus of claim 1, wherein said means of detecting calibration position alignment comprises:
  a. one or more stored optical patterns on said surface of said first part of said mechanical apparatus, such that the locations of one or more said stored optical patterns correspond to said calibration positions,
  b. an optical means of correlating one or more said current optical patterns obtained from said surface of said first part of said mechanical apparatus with one or more said stored optical patterns, such that said calibration position alignment occurs when one or more said current optical patterns obtained from said surface of said first part of said mechanical apparatus correlates with one more said stored optical patterns that correspond to said calibration position, such that one or more said current optical patterns obtained from said surface are adjacent or overlapping, and such that one or more said stored optical patterns that correspond to said calibration position are adjacent or overlapping.

6. The optical apparatus of claim 5, wherein stored optical patterns of said surface of said first part of said mechanical apparatus are marks created on said surface to stand out from natural optical patterns on said surface, whereby said marks created to stand out from said natural optical patterns on said surface of said first part of said mechanical apparatus enable simple reliable correlation of one or more said current optical patterns obtained from said surface of said first part of said mechanical apparatus with one or more said stored optical patterns that correspond to said calibration,
  whereby said stored optical patterns are said marks which are easy to distinguish from said natural optical patterns, as a result said stored optical patterns can be defined in a simple compact manner,
  whereby said marks created to stand out from said natural optical patterns on said surface of said first part of said mechanical apparatus can be created to correspond to predefined said stored optical patterns, such that optical patterns obtained from said surface of said first part of said mechanical apparatus corresponding to said marks do not need to be stored for later correlation.

7. The optical apparatus of claim 5, wherein stored optical patterns of said surface of said first part of said mechanical apparatus are optical patterns recorded from said surface of said first part of said mechanical apparatus, such that the location of said optical patterns recorded relates to said calibration positions,
  whereby said optical patterns recorded from said surface of said first part of said mechanical apparatus without marks created on said surface of said first part of said mechanical apparatus,
  whereby said marks are not created on said surface of said first part of said mechanical apparatus, eliminating manufacturing cost and/or maintenance cost associated with said marks.

8. The optical apparatus of claim 2, wherein said means of detecting calibration position alignment comprises:
  a. one or more stored optical patterns on said surface of said first part of said mechanical apparatus, such that the location of one or more said stored optical patterns correspond to said calibration positions,
  b. an optical means of correlating one or more current optical patterns obtained from said surface of said first part of said mechanical apparatus with one or more said stored optical patterns, such that said calibration position alignment has occurred when one or more said current optical pattern obtained from said surface of said first part of said mechanical apparatus correlates with one or more said stored optical patterns that correspond to said calibration position, such that one or more said current optical patterns obtained from said surface are adjacent or overlapping, such that one or more said stored optical patterns that correspond to said calibration position are adjacent or overlapping, and such that said optical means of correlating one or more said current optical patterns obtained from said surface of said first part of said mechanical apparatus with one or more said stored optical patterns is the same said optical means of measuring relative displacement correlating said current optical pattern obtained from said surface of said first part of said mechanical apparatus with said previous optical pattern obtained from said surface of said first part of said mechanical apparatus,
  whereby cost is further reduced by reusing said optical means of measuring relative displacement correlating said current optical pattern with said previous optical pattern and correlating one or more current optical patterns with one or more said stored optical patterns.

9. The optical apparatus of claim 1, wherein one or more said calibration positions are locally distinct, such that said absolute displacement of said first part of said mechanical apparatus at said calibration positions is known in the event of one or more failures by said means of detecting calibration position alignment,
  whereby one or more said failures by said means of detecting said calibration position alignment results at worst in lower accuracy and/or precision of measuring absolute mechanical displacement and does not prevent measuring absolute mechanical displacement.

10. The optical apparatus of claim 1, further including improved said estimated absolute mechanical displacement measurements, comprising:
  a. a collection of said known absolute displacement and said estimated absolute mechanical displacement data pairs obtained at said calibration positions, such that said known absolute displacement of said first part of said mechanical apparatus is at said calibration position alignment, such that said estimated absolute mechanical displacement is obtained at same said calibration position alignment and is a summation of the cumulative net relative displacement obtained by said optical means of measuring relative displacement since previously detected said calibration position alignment and said known absolute displacement at same said previously detected calibration position alignment,
  b. one or more said correction multipliers, such that said correction multipliers are determined by regression fitting said collection of said known absolute displacement and said estimated absolute mechanical displacement data pairs obtained at said calibration positions, such that said correction multipliers are applied to said cumulative net relative displacement and/or individual relative displacement measurements obtained by said optical means of measuring relative displacement comprised in said cumulative net relative displacement in order to reduce the difference between said known absolute displacement and said estimated absolute mechanical displacement data pairs obtained at said calibration positions, and such that the correlation coefficient of said regression fitting provides a confidence measure of said estimated absolute mechanical displacement, c. one or more receivers of said estimated absolute displacement, such that if said estimated absolute displacement is accompanied by its associated confidence measure, said receivers monitor said confidence measure and trust said estimated absolute mechanical displacement accordingly, whereby the error between said known absolute displacement and said estimated absolute mechanical displacement is minimized, thereby improving the accuracy of said estimated absolute displacement measurements, whereby one or more said receivers of said estimated absolute mechanical displacement with its associated confidence measure determine when said optical apparatus for measuring absolute mechanical displacement is malfunctioning, which is indicated by excessively low said confidence measure.

11. An optical method of measuring absolute mechanical displacement of actuators, joints, or other mechanical apparatus that contain mechanical parts that move with respect to each other, comprising the steps of:

a. optically measuring relative displacement of second part of said mechanical apparatus with respect to first part of said mechanical apparatus where the method of optically measuring relative displacement is fixed to said second part of said mechanical apparatus and where said second part is any of the parts of said mechanical apparatus, such that said method of optically measuring relative displacement is directed at the surface of said first part of said mechanical apparatus where said first part is any of the other parts of said mechanical apparatus, and such that creating marks on said surface to stand out from natural optical patterns on said surface are not required for optically measuring relative displacement, b. detecting alignment at a calibration position where the absolute displacement of said first part of said mechanical apparatus at said calibration position is known, such that each said calibration position has a known absolute displacement, c. estimating absolute displacement by summing the cumulative net said optically measured relative displacement since detected alignment at a calibration position and said known absolute displacement at same said detected alignment at said calibration position, such that if one or more correction multipliers are available, applying one or more said of correction multipliers to said cumulative net relative displacement and/or individual relative displacement measurements obtained by said optical means of measuring relative displacement comprised in said cumulative net relative displacement, whereby the measured absolute displacement of said first part of said mechanical apparatus is corrected at said calibration positions and does not require adjacent said calibration positions, whereby the absolute displacement of said first part of said mechanical apparatus is estimated with accuracy and precision by said optical means of measuring relative displacement allowing for a reduction in the number of said calibration positions, whereby the apparatus cost is reduced through the reduction in required number of said calibration positions.

12. The optical method of claim 11, wherein the method of optically measuring relative displacement correlates the current optical pattern obtained from said surface of said first part of said mechanical apparatus with a previous optical pattern obtained from said surface of said first part of said mechanical apparatus, whereby relative displacement are measured with mass produced sensor components used by optical mice.

13. The optical method of claim 11, wherein the method of optically measuring relative displacement, comprises:

a. splitting a monochromatic coherent light beam between a reference and measurement branch of an interferometer, b. determining the Doppler frequency shift that light in said measurement branch undergoes, such that the sign and magnitude of said Doppler frequency shift correspond respectively to the direction and magnitude of the optically measured velocity, such that said optically measured velocity over the measurement interval is used to obtained measured relative displacement, whereby relative displacement are measured with mass produced sensor components used by optical mice.

14. The optical method of claim 11, wherein the method of detecting alignment at a calibration position, comprises:

a. fixing one or more proximity targets to said first part or said second part of said mechanical apparatus at locations that correspond to said calibration positions, b. mounting one or more proximity sensors to other said second part or said first part of said mechanical apparatus, as required to detect said proximity targets, whereby said calibration positions are marked by said proximity targets, which are suitable for capacitive, photoelectric, and/or magnetic detection by said proximity sensors, whereby the measured absolute displacement is corrected by said proximity sensors, which detect said proximity targets.

15. The optical method of claim 11, wherein the method of detecting alignment at a calibration position, comprises:

a. storing optical patterns for locations of said surface of said first part of said mechanical apparatus that correspond to said calibration positions, b. optically correlating one or more current optical patterns obtained from said surface of said first part of said mechanical apparatus with one or more stored optical patterns, such that said calibration position alignment occurs when one or more said current optical patterns obtained from said surface of said first part of said mechanical apparatus correlates with one more said stored optical patterns that correspond to said calibration position, such that one or more said current optical patterns obtained from said surface are adjacent or overlapping, and such that one or more said stored optical patterns that correspond to said calibration position are adjacent or overlapping.

16. The optical method of claim 15, wherein the method of storing optical patterns, comprises marking said surface to stand out from natural optical patterns on said surface at locations that correspond to said calibration positions, whereby said marks created to stand out from said natural optical patterns on said surface of said first part of said mechanical apparatus enable simple reliable correlation of one or more said current optical patterns obtained from said surface of said first part of said mechanical apparatus with one or more said stored optical patterns that correspond to said calibration, whereby said stored optical patterns are said marks which are easy to distinguish from said natural optical patterns, as a result said stored optical patterns can be defined in a simple compact manner, whereby said marks created to stand out from said natural optical patterns on said surface of said first part of said mechanical apparatus can be created to correspond to predefined said stored optical patterns, such that optical patterns obtained from said surface of said first part of said mechanical apparatus corresponding to said marks do not need to be stored for later correlation.

17. The optical method of claim 15, wherein the method of storing optical patterns, comprises recording optical patterns obtained from said surface of said first part of said mechanical apparatus at locations that correspond to said calibration positions, whereby stored optical patterns of said surface of said first part of said mechanical apparatus are optical patterns recorded from said surface of said first part of said mechanical apparatus, such that the location of said optical patterns recorded relates to said calibration positions, whereby said optical patterns recorded from said surface of said first part of said mechanical apparatus without marks created on said surface of said first part of said mechanical apparatus, whereby said marks are not created on said surface of said first part of said mechanical apparatus, eliminating manufacturing cost and/or maintenance cost associated with said marks.

18. The optical method of claim 12, wherein the method of detecting alignment at a calibration position, comprises:
   a. storing optical patterns for locations of said surface of said first part of said mechanical apparatus that correspond to said calibration positions,
   b. optically correlating one or more current optical patterns obtained from said surface of said first part of said mechanical apparatus with one or more said stored optical patterns, such that said calibration position alignment occurs when one or more said current optical patterns obtained from said surface of said first part of said mechanical apparatus correlates with one more said stored optical patterns that correspond to said calibration position, such that one or more said current optical patterns obtained from said surface are adjacent or overlapping, such that one or more said stored optical patterns that correspond to said calibration position are adjacent or overlapping, and such that the method of optically correlating one or more said current optical patterns obtained from said surface of said first part of said mechanical apparatus with one or more said stored optical patterns is the same method of optically correlating said current optical pattern obtained from said surface of said first part of said mechanical apparatus with said previous optical pattern obtained from said surface of said first part of said mechanical apparatus, whereby the measured absolute displacement of said first part of said mechanical apparatus is corrected at said calibration positions and does not require adjacent said calibration positions, whereby the absolute displacement of said first part of said mechanical apparatus is estimated with accuracy and precision by said optical means of measuring relative displacement allowing for a reduction in the number of said calibration positions, whereby the apparatus cost is reduced through the reduction in required number of said calibration positions.

19. The optical method of claim 11, wherein one or more said calibration positions are locally distinct, comprises distinctly detecting alignment at one or more calibration positions where the absolute displacement of said first part of said mechanical apparatus at said calibration positions is known, such that one or more failures in detecting alignment at one or more calibration positions does not cause unknown absolute displacement at detected said calibration positions, whereby one or more said failures by said means of detecting said calibration position alignment results at worst in lower accuracy and/or precision of measuring absolute mechanical displacement and does not prevent measuring absolute mechanical displacement.

20. The optical method of claim 11, further including an improved method of estimating absolute displacement, comprises:
   a. collecting data pairs at said calibration positions by using said known absolute displacement and estimating absolute displacement by summing the cumulative net said optically measured relative displacement since detected alignment at a previous calibration position and said known absolute displacement at same said detected alignment at said previous calibration position,
   b. regression fitting said data pairs collected at said calibration positions to obtain one or more said correction multipliers, such that the difference between said data pairs collected at said calibration positions is reduced by applying one or more said correction multipliers to said cumulative net relative displacement and/or individual relative displacement measurements obtained by the method of optically measuring relative displacement comprised in said cumulative net relative displacement, and such that the correlation coefficient of said regression fitting provides a confidence measure of estimated absolute displacement,
   c. monitoring said confidence measure of said estimated absolute displacement by one or more receivers of said estimated absolute displacement, such that if said estimated absolute displacement is accompanied by its associated confidence measure, said receivers monitoring said confidence measure trust said estimated absolute displacement accordingly, whereby the error between said known absolute displacement and said estimated absolute mechanical displacement is minimized, thereby improving the accuracy of said estimated absolute displacement measurements, whereby one or more said receivers of said estimated absolute mechanical displacement with its associated confidence measure determine when said optical apparatus for measuring absolute mechanical displacement is malfunctioning, which is indicated by excessively low said confidence measure.

* * * * *